(12) United States Patent
Panje et al.

(10) Patent No.: US 9,681,197 B2
(45) Date of Patent: Jun. 13, 2017

(54) METHODS OF IMPLEMENTING MULTI MODE TRICKPLAY

(71) Applicant: General Instrument Corporation, Horsham, PA (US)

(72) Inventors: Krishna Prasad Panje, Bangalore (IN); William P. Franks, San Diego, CA (US); Murali Sahasranaman, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 225 days.

(21) Appl. No.: 14/338,590

(22) Filed: Jul. 23, 2014

(65) Prior Publication Data

US 2014/0337904 A1 Nov. 13, 2014

Related U.S. Application Data

(63) Continuation-in-part of application No. 13/832,191, filed on Mar. 15, 2013, now Pat. No. 8,826,346.

(51) Int. Cl.
*H04N 7/173* (2011.01)
*H04N 21/6587* (2011.01)
(Continued)

(52) U.S. Cl.
CPC ..... *H04N 21/6587* (2013.01); *H04N 21/2387* (2013.01); *H04N 21/26258* (2013.01);
(Continued)

(58) Field of Classification Search
CPC ....................... H04N 21/2387; H04N 21/6587
(Continued)

(56) References Cited

U.S. PATENT DOCUMENTS 5,668,918 A 9/1997 Augenbraun et al.
6,965,724 B1 * 11/2005 Boccon-Gibod ...... H04N 5/783
386/344

(Continued)

FOREIGN PATENT DOCUMENTS

WO 0184336 A1 11/2001

OTHER PUBLICATIONS

Apple Inc. Technical Note TN2288, "Example Playlist Files for use with HTTP Live Streaming", found at <http://developer.apple.com/library/ios/#technotes/tn2288/_index.html>,, pp. 1-19.

(Continued)

*Primary Examiner* — Pankaj Kumar
*Assistant Examiner* — Sahar Baig
(74) *Attorney, Agent, or Firm* — Thomas A. Ward (57) ABSTRACT

A method of operating a server and an IP client device for presentation of video content to a viewer that includes a trickplay function. The server partitions media chunks into several sub chunks and includes information about the sub chunks in a manifest. The client plays the needed sub chunks to implement a desired play rate. As an alternative to providing sub chunk information in the manifest, the server sends key frame information in the manifest. The client plays needed frames of the key frames to implement a desired play rate. The sub chunk information as well as key frame information is encoded into the manifest as a standard comment or chunk filename. In another alternative, the IP client sends a trickplay request and based on that, the server signals either the sub chunks to be played or the key frames to be played to affect the desired speed. In yet another variation, the server can also remove the unwanted sub chunks or key frames to affect the desired play rate at the IP client.

4 Claims, 4 Drawing Sheets (51) Int. Cl.
*H04N 21/845* (2011.01)
*H04N 21/2387* (2011.01)
*H04N 21/262* (2011.01)
*H04N 21/61* (2011.01)
*H04N 21/643* (2011.01)
*H04N 21/854* (2011.01)

(52) U.S. Cl.
CPC ... *H04N 21/6125* (2013.01); *H04N 21/64322* (2013.01); *H04N 21/845* (2013.01); *H04N 21/8455* (2013.01); *H04N 21/8456* (2013.01); *H04N 21/85406* (2013.01)

(58) Field of Classification Search
USPC .............................................. 725/90, 88, 94
See application file for complete search history.

(56) References Cited

U.S. PATENT DOCUMENTS

| | | | |
|---|---|---|---|
| 8,208,790 B2 | 6/2012 | Toma et al. | |
| 8,290,338 B2 | 10/2012 | Sasaki et al. | |
| 8,826,346 B1 | 9/2014 | Panje et al. | |
| 2010/0169303 A1 | 7/2010 | Biderman et al. | |
| 2010/0303444 A1 | 12/2010 | Sasaki et al. | |
| 2011/0129198 A1 | 6/2011 | Toma et al. | |
| 2011/0219063 A1 | 9/2011 | Park et al. | |
| 2011/0317760 A1 | 12/2011 | Chen et al. | |
| 2012/0189274 A1 | 7/2012 | Toma et al. | |
| 2013/0019273 A1* | 1/2013 | Ma ................... | H04N 21/23430 725/90 |
| 2014/0059244 A1* | 2/2014 | Panje ............... | H04N 21/23436 709/231 |
| 2016/0323342 A1* | 11/2016 | Luby .................... | H04L 65/601 |

OTHER PUBLICATIONS

PCT Search Report & Written Opinion, RE: Application No. PCT/US2015/025214, dated Jul. 16, 2015.

J.Y. Lee, et al., "Virtual Segmentation of TS Packetized Video using Key-frame Information", 94th MPEG Meeting (Motion Picture Expert Group or ISO/IEC JTC1/SC29/WG11), Oct. 6, 2010.

Y. Wang, et al.,"EE#6: Trick Mode and Random Access Signaling (TRA)", 94th MPEG Meeting (Motion Picture Expert Group or ISO/IEC JTC1/SC29/WG11), Oct. 11, 2010.

* cited by examiner

METHODS OF IMPLEMENTING MULTI MODE TRICKPLAY

CLAIM FOR PRIORITY

This is a continuation-in-part of U.S. patent application Ser. No. 13/832,191, filed Mar. 15, 2013, which is incorporated by reference herein in its entirety.

BACKGROUND

The subject matter of this application relates to methods of implementing trickplay.

For many years programming viewable on a TV appliance has been broadcast by employing an analog video signal to modulate a radio frequency carrier and propagating the modulated RF carrier over a cable network. The analog video signals for different broadcast TV channels (commonly associated with channel names, such an NBC, CBS and FOX) are impressed on carriers at different frequencies. A receiver in the subscriber premises is tuned to the carrier frequency of the channel that is desired for screening. The receiver may be integrated in the TV appliance or it may be included in a separate device, such as a set-top box (STB).

Television programming and other multimedia content (MM content), including audio, video, graphics, text and data, may also be distributed using digital cable technology. In this case, the content for a given service (corresponding to a channel of the analog broadcast television domain) may be received at the cable network headend in the form of one or more packetized elementary streams that have been encoded in accordance with appropriate compression standards, such as the video compression standard that is commonly referred to as H.264/AVC. The cable network operator may distribute several services by organizing the payloads of the corresponding packetized elementary streams in transport stream packets that are delivered over the cable network physical infrastructure using one or more MPEG-2 systems transport streams. A cable network operator may also distribute digital audio/video (AV) content over the cable network physical infrastructure using internet protocol TV (IPTV).

In an implementation of IPTV, AV content for live TV channels is encoded and encrypted and is made available through an IP server, a delivery network (such as the cable network physical infrastructure or the cellular telephone infrastructure) and a home gateway to an IP client running on a computing device in a TV appliance or an STB.

Digital cable technology facilitates use of trickplay functions in presentation of AV content. A trickplay function allows the AV content to be presented at a different rate and/or in a different direction of evolution from the normal rate and direction of evolution. Thus, whereas AV content is normally presented at a rate corresponding to 30 video frames per second (fps) evolving in a forward direction, trickplay functions permit fast forward presentation at, for example, at a rate corresponding to two or four times (2× or 4×) the normal video frame rate and reverse presentation, i.e. presentation in the opposite direction from normal evolution at, for example, the normal frame rate or a rate corresponding to 2× or 4× times the normal frame rate.

SUMMARY OF THE INVENTION

In accordance with a first aspect of the subject matter disclosed herein there is provided a method of operating an IP client device for presentation of video content to a viewer that includes multiple trickplay markings provided in the chunks of the video. In this first aspect in a normal play mode the video content is received from a server in fragments each containing a plurality of video frames and the IP client device presents the video frames at a predetermined, uniform frame rate F frames per second, whereby a fragment containing N frames has a normal presentation duration of N/F seconds, the method comprising creating a manifest at the server such that the server marks each chunk with multiple predetermined granularity of spacing from now on called as trickplay sub chunk depending upon chunk duration and total playlist duration. These trickplay markings (denoting trickplay sub chunks) are generated such that they start with a reference frame and end with any video frame. If the server is creating the video by transcoding, then the server creates each chunk such that reference frames and trickplay markings are placed almost equidistantly. The above trickplay markings are conveyed to an IP client as a standard playlist comment. In another alternative the trickplay markings are implicitly conveyed to a client by naming the content chunk filename with these trickplay markings thus denoting each of the trickplay sub chunks. The IP client upon receiving the playlist, parses the trickplay markings and plays needed individual sub chunks to meet the desired trickplay speed. To meet the desired speed, the client can play and skip alternate sub chunks, or play one group of sub chunks and skip a next group of sub chunks.

In accordance with a second aspect of the subject matter disclosed markings for trickplay are set among sub chunks to affect play at a desired speed. In the second aspect, the method comprises receiving a trickplay request, transmitting the trickplay request to a server, receiving a manifest from the server, wherein the manifest is created on the server such that it indicates trickplay sub chunks to be played to affect the client desired trickplay speed by marking the needed trickplay sub chunks along with specific sub chunks to play to affect the desired speed. The above trickplay markings (hence sub chunks) along with the instruction on sub chunks to be played are conveyed to an IP client as standard playlist comment. In another alternative the trickplay markings are implicitly conveyed to client by naming the content chunk filename with these trickplay markings thus denoting only trickplay sub chunks to be played to affect desired trickplay speed. In another embodiment the server removes sub chunks from the chunk such that it sends only the needed sub chunks (or creates a smaller chunk equal to sub chunk) to affect desired trickplay speed when the server implements the desired trickplay.

In accordance with a third aspect of the subject matter the I frames are marked with spacing depending on chunk duration to control trickplay. The third aspect method comprises creating a manifest at the server such that the server marks I frames with predetermined granularity of spacing depending upon chunk duration and total playlist duration. The above frame markings are conveyed to IP client as standard playlist comment. In another alternative the frame markings are implicitly conveyed to a client by naming the content chunk filename with these frame markings. The IP client upon receiving the playlist, parses the frame markings and plays needed individual frame(s) to meet the desired trickplay speed. In one variation by playing a number of I frames for a duration of (total chunk duration/trick play speed)/(Number of I frames in the chunk) a desired trickplay is achieved by the IP client.

In accordance with a fourth aspect of the subject matter speed is affected by marking the I frames needed for playing along with providing an instruction to play specific frames.

The third aspect method comprises receiving a trickplay request, transmitting the trickplay request to a server, receiving a manifest from the server, wherein the manifest is created on the server such that it indicates I frames to be played to affect the client desired trickplay speed by marking the needed I frames along with the instruction to play specific frames. The above marked frames to be played are conveyed to an IP client as standard playlist comment. In another alternative the frame markings are implicitly conveyed to a client by naming the content chunk filename with these frame markings thus denoting only the frames to be played to affect desired trickplay speed. In another embodiment the server removes the frames from the chunk such that it sends only the needed frames to affect trickplay.

BRIEF DESCRIPTION OF THE DRAWINGS

For a better understanding of the subject matter disclosed herein, and to show how the same may be carried into effect, reference will now be made, by way of example, to the accompanying drawings, in which.

DETAILED DESCRIPTION

Some aspects of this description relate to an implementation employing HTTP Live Streaming (HLS) but the subject matter described herein is not restricted to implementations employing HLS.

Using IPTV streaming technology, MM content may be created and published to an IP server and thereby made available within the home or over the internet to IP client devices. The MM content may be what is perceived by the viewer to be live, such as a contemporaneous sporting event, or prerecorded, such as the previous week's episode of a drama series. In the case of live content, a transcoder transcodes the compressed MM content as short chunks (also known as segments), typically having a duration of from 1-10 seconds. At a 30 fps rate, a chunk typically contains data for 30 to 300 video frames. Each chunk (or sequence of chunks) is saved as a file, for example with a name in the form Myrecord_chunki.ts (where i is an index), and the file is saved at a network location defined by an HTTP Uniform Resource Locator (URL) that can be used in an HTTP command to access the chunk. Thus, the file is associated with a unique Uniform Resource Indicator (URI) in the form http://URL/Myrecord_chunk1.ts.

The IP client selects the MM content for presentation based on commands communicated to the client device, for example by a hand-held remote control device. The IP server responds to a play command provided by the IP client by creating a manifest (or playlist) that specifies the URIs of the chunks that form the selected MM content and allows the IP client to access the content using an appropriate HTTP command, such as the Get command.

The client receives the manifest, recovers the URIs for chunk files from the manifest and sends HTTP commands identifying URI to the server. The server responds by retrieving the files containing the requested chunks, encapsulating the files in IP packets, and transmitting the IP packets to the client. It is not necessary that the IP client should retrieve the files one at a time, in response to respective requests, but it may instead send an HTTP command identifying the URIs of several chunks, in which case the server transmits IP packets encapsulating several files containing respective chunks.

The IP client receives the IP packets conveying the AV content and decrypts and decodes the packets to produce an AV signal for presenting the AV content to the viewer.

Prerecorded content is transcoded as chunks and may be recorded as chunks, with each chunk associated with a unique URI, as in the case of live content, but it is also possible to concatenate the chunks and form a single file containing all the frames for an entire program (or a substantial part of the program, for example one or more scenes) and associate the file with one unique URI, e.g. in the form http://URL/Myrecord.ts. Playing of the AV content is similar to the case of live content except that the manifest identifies fewer URIs and the IP client requests fewer files from the server.

It will be appreciated that in the case of typical "live" content the chunks need only be recorded transiently whereas the file or files containing the chunks of prerecorded content may be stored indefinitely for viewing when desired by the customer, whereas in the case of linear television (such as broadcast television), in which the program is made available at a particular time and as a particular service and the viewer decides whether to take it or leave it, the content is concurrently ingested by a transcoder and the content is made available only transiently to the viewer.

In the event that the user selects a trickplay mode of operation, e.g. fast forward, the IP client continues to receive the chunk files, and may continue to decode each frame, but drops some of the frames so that, for example, in the case of 2× fast forward only half of the frames are presented to the viewer. Since the frames are presented at the same rate (30 fps) but half the frames are omitted, the content evolves at twice the normal rate.

Since the client receives all the frames at twice the normal frame rate and processes all the frames, network congestion may impede delivery of the files and limitations on the processing power of the IP client device may limit the ability of the IP client to decryt and decode the IP packets. In either event, the quality of the trickplay presentation of the AV content may be impaired.

Moreover, this mode of operation requires the IP client to be trickplay-aware, i.e. to function differently in trickplay mode from normal mode. Further there is a need for a system which enables the trickplay on a particular IP client while another IP client served by the same IP server may not need trickplay with the IP server serving the same manifest (playlist) for both clients. Thus, by using the same manifest (playlist), one IP client can provide a trickplay experience while another IP clients use the same manifest to provide linear viewing within the chosen HTTP live streaming standard.

Modern video compression standards encode video content using intracoded (I) frames, predictively coded (P) frames and bi-directionally predictively coded (B) frames.

An I frame can be decoded without information from any other frame whereas a P frame or a B frame cannot be decoded without information from at least one other frame.

Figure 1:
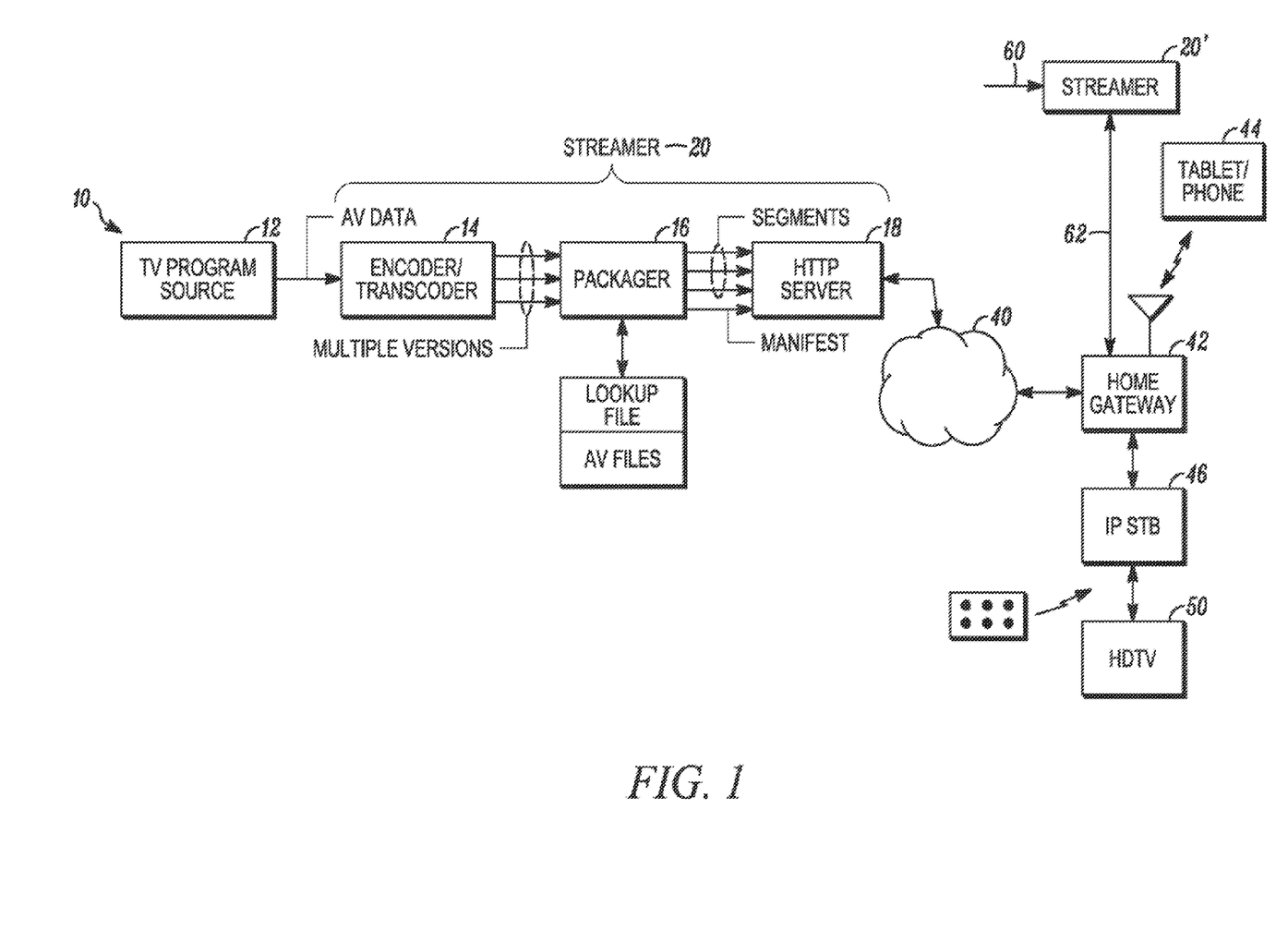
FIG. 1 is a schematic block diagram illustrating how trickplay operation may be applied to delivery of AV content by IPTV.

Referring to FIG. 1, an IPTV streaming appliance 10 includes a TV program source 12 that delivers a signal conveying the AV content for a given service to a streamer 20, the main functional blocks of which are an encoder/transcoder 14, a packager 16 and an HTTP server 18. The transcoder produces at least one, and possibly several, versions of the AV content encoded in accordance with appropriate audio and video compression standards. For each version, the transcoder produces a video elementary stream and a first language audio elementary stream, and may also produce other elementary streams, such as a second language audio stream and a subtitle stream. The several elementary streams are multiplexed together to produce an MPEG-2 single program transport stream. For the purpose of this description, we will assume that the transcoder produces only one version of the AV content.

The transcoder 14 provides the AVC single program transport stream to the packager 16, which slices the AV content into consecutive chunks and supplies the sequence of chunks to the HTTP server 18 as respective AV content files. The HTTP server encapsulates the AV content files in IP packets and makes the IP packets available to the internet 40.

In one embodiment (to explain the first and second aspects of the invention) For each chunk, the streamer prepares the following sub chunk information list to be passed to the client as a standard manifest comment or the above list is passed to the client as part of content filename. The standard manifest comment, depending upon a HTTP streaming standard; adheres to that particular streaming standard. Sub chunk information to be part of each chunk comprises the following information—

| The sub chunk information to be part of each chunk | Explanation |
| --- | --- |
| Number of sub chunks | The number of sub chunks within a chunk - a number |
| Sub chunk durations | The time duration of each sub chunk - in mille seconds. |
| Number of frames in sub chunk | The number of frames in each sub chunk - a number |
| Byte offsets of each sub chunk | Byte offset of each sub chunk from the beginning of the chunk - a number |
| Size of each sub chunk | Byte size of each sub chunk - a number |
| Sub chunks to play for x Fast Forward | The sequence of sub chunks to be played to achieve a fast forward at the rate of x |
| Sub chunks to play for x Rewind | The sequence of sub chunks to be played to achieve a rewind at the rate of x |

If the server is creating the video by transcoding, then the server creates each chunk such that reference frames, sub chunks are placed almost equidistantly and each sub chunk starts from a reference frame. However, since the sub chunk information list contains the duration and number of frames, the client can do any fine adjustment needed to meet the play durations.

At a customer premises, a home gateway 42 (including a router that is not separately shown) is connected to the internet 40. The home gateway is connected wirelessly to a tablet or phone 44. A wired connection is provided between the home gateway 42 and an STB 46, which is connected to a TV appliance 50.

In order to present the program content provided by the TV program source 12 to a viewer in normal operation, an IP client running on a computing device, such as the STB 46, sends an appropriate HTTP command, such as the HTTP Get command, to the server 18, signifying that the IP client wishes to acquire the AV data for a selected service from the server 18. The streamer creates a manifest that specifies the URIs of the files that contain the data for the selected service and transmits the manifest to the IP client. The IP client running on the STB 46 uses the information in the manifest to request the files and the server transmits IP packets containing the data for the selected service to the client. The IP client decrypts and decodes the IP packets and generates an AV signal which it supplies to the TV applicant to present the AV content to the viewer.

To explain the first aspect of the invention—The streamer serves the manifest which includes all or a subset of the above sub chunk information as part of manifest comment. Each chunk URI is preceded by a comment containing sub chunk information if each chunk is having different sub chunk information. If each chunk is having the same sub chunk information for some of the sub chunk information list, then a single comment served once as part of a manifest fetch is sufficient. The new manifest may include statements in the following form as an example:

```
#EXTINF:0.5,
# Number of sub chunks = 4; sub chunk duration = 0.250,
0.250, 0.250,0.250; Number of frames in sub chunk = 8, 7, 8, 7; Byte
offsets of each sub chunk = 0, 15626, 34256, 65686; size of each sub
chunk = 12356, 12366, 12346, 12386
    http://192.168.0.185/Myrecord_chunk1.ts
    #EXTINF:0.5,
# Number of sub chunks = 4, sub chunk duration = 0.250,0.280,0.220,
0.250; Number of frames in sub chunk = 7, 9, 6, 8; Byte offsets of each
sub chunk = 0, 15626, 44256, 65686; size of each sub chunk = 12356,
14366, 11346, 12386
    http://192.268.0.185/Myrecord_chunk2.ts
    #EXTINF:0.5,
...
```

Alternatively, the new manifest may include statements in the following form with a chunk file name containing sub chunk information list as encoded below—

```
#EXTINF:0.5,
http://192.168.0.185/
    Myrecord_chunk1_4_0_8_250_12356_15626_7_250
_12366_34256_8_250_12346_65686_7_250_12386.ts
    #EXTINF:0.5,
    http://192.268.0.185/Myrecord_chunk2_4_0_....ts
...
```

In the above example file name Myrecord_chunk1_4_0_8_250_12356_15626_7_250_12366_34256_8_250_12346_6_5686_7_250_12386.ts "4" denotes Number of sub chunks, "0" denotes byte offset of the first sub chunk, "8" denotes the number of frames in the first sub chunk, "250" denotes the duration of the first sub chunk, "12356" denotes the size of the first sub chunk. Similarly, "15626" denotes byte offset of the second sub chunk, "7" denotes the number of frames in the second sub chunk, "250" denotes the duration of second sub chunk, "12366" denotes the size of the second sub chunk and so on for all four sub chunks.

The sub chunk information list in the manifest may also contain sub chunks to play for x Fast Forward or Rewind, so that it would be easy for the IP client to know which sub chunks to play to achieve the indicated speed.

In both examples, the EXT-X-DISCONTINUITY tag could be included between consecutive chunks to indicate an encoding discontinuity between the preceding chunk and the following chunk.

The IP client is receiving above manifest and plays the chunks linearly. Let us assume that the IP client receives a command signifying that the viewer has requested 2× fast forward operation. Let us assume that each chunk contains four sub chunks. The IP client uses the sub chunk information list to determine the number of sub chunks that must be presented during the normal presentation of each chunk in order to provide 2× operation (i.e. two sub chunks in the case of a chunk containing four sub chunks). The IP client uses the sub chunk information list provided as a comment in the manifest or as a encoded chunk file name to determine the byte offset and size of each sub chunk and fetches only sub chunk content from server by issuing a HTTP Get command with needed sub chunk size (two sub chunks within a chunk) and presents it to the user thus achieving 2× operation.

By playing only two sub chunks of each chunk, and omitting two sub chunks of each chunk, a 2× fast forward trickplay function is provided. A 4× fast forward trickplay function may be provided by fetching and playing one sub chunk of a chunk containing four sub chunks.

The IP clients who don't need trickplay can play the content of the manifest linearly without any side effects. Thus the server is trickplay agnostic.

To explain the second aspect of the invention—The streamer serves the manifest which includes all or subset of above sub chunk information as part of manifest comment along with instruction on specific sub chunks to play to achieve IP client desired play speed. The main advantage is that, in case of sub chunks having different durations across chunks or in a variable frame rate situation, the server can do a fine adjustment of play duration by picking up specific sub chunks of variable durations. Each chunk URI is preceded by a comment containing sub chunk information if each chunk is having different sub chunk information along with instructions on specific sub chunks to play to achieve IP client desired play speed. If each chunk is having the same sub chunk information for some of the sub chunk information list, then a single comment served once as part of a manifest fetch is sufficient.

The new manifest may include statements in the following form as an example with a chunk file name containing a sub chunk information list containing sub chunks to play in the indicted order:

```
#EXTINF:0.5,
# Number of sub chunks = 4; Byte offsets of each sub chunk = 0, 15626, 34256, 65686; size of each sub chunk = 12356, 12366, 12346, 12386, sub chunks to play for 2x fast forward = 0,2
    http://192.168.0.185/Myrecord_chunk1.ts
#EXTINF:0.5,
# Number of sub chunks = 4, Byte offsets of each sub chunk = 0, 15626, 44256, 65686; size of each sub chunk = 12356, 14366, 11346, 12386, sub chunks to play for 2x fast forward = 0,2
    http://192.268.0.185/Myrecord_chunk2.ts
#EXTINF:05,
...
```

Alternatively, the new manifest may include statements in the following form with the chunk file name containing a sub chunk information list that contains sub chunks to play in the indicted order as encoded below—

```
#EXTINF:0.5,
    # Number of sub chunks = 4; sub chunk duration = 0.250, 0.250, 0.250,0.250; Number of frames in sub chunk = 8, 7, 8, 7; Byte offsets of each sub chunk = 0, 15626, 34256, 65686; size of each sub chunk = 12356, 12366, 12346, 12386
        http://192.168.0.185/Myrecord_chunk1_4_0_2_0_12356_15626_12366_34256_12346_65686_12386.ts
    #EXTINF:0.5,
        http://192.268.0.185/Myrecord_chunk2_4_0_....ts
...
```

In the above example file name Myrecord_chunk1_4_0_2_0_12356_15626_12366_34256_12346_65686_12386.ts "4" denotes Number of sub chunks, "0" denotes first sub chunk to play, "2" denotes the next sub chunk to play, next "0" denotes the byte offset of the first sub chunk, "12356" denotes the size of the first sub chunk. Similarly, "15626" denotes the byte offset of the second sub chunk, "12366" denotes the size of the second sub chunk and so on for all four sub chunks.

In both examples, the EXT-X-DISCONTINUITY tag could be included between consecutive chunks to indicate an encoding discontinuity between the preceding chunk and the following chunk.

If the IP client receives a command signifying that the viewer has requested the 2× fast forward operation, the IP client sends an HTTP command to the streamer signifying that a fast forward (FF) operation has been requested. The streamer server calculates the sub chunks to be played to achieve the desired speed and creates the manifest containing the information on specific sub chunks to play. The IP client receiving the above manifest plays the chunks linearly as signalled in the order. Let us assume that the IP client receives a command signifying that the viewer has requested a 2× fast forward operation. Let us assume that each chunk contains four sub chunks. The IP client uses the sub chunk information list to determine the specific sub chunks that must be presented during the normal presentation of each chunk in order to provide a 2× operation (i.e. two sub chunks in the case of a chunk containing four sub chunks). The IP client uses the sub chunk information list provided as a comment in a manifest or as a encoded chunk file name to determine the byte offset and size of the specified sub chunk and fetches only sub chunk content from the server by issuing a HTTP Get command with needed sub chunk size (two sub chunks within a chunk) and presents it to the user thus achieving 2× operation.

By playing only two sub chunks of each chunk, and omitting two sub chunks of each chunk, a 2× fast forward trickplay function is provided with server aid. A 4× fast forward trickplay function may be provided by fetching and playing one sub chunk of a chunk containing four sub chunks or as signalled by the server.

The IP clients who don't need trickplay can play the content of the manifest linearly without any side effects. Thus the other client can remain trickplay agnostic when not requesting trickplay.

In another embodiment, if the IP client receives a command signifying that the viewer has requested 2× fast forward operation, the IP client sends an HTTP command to the streamer signifying that fast forward (FF) operation has been requested. The streamer server calculates the sub chunks to be played to achieve the desired speed, removes the sub chunks not needed from chunk data and creates the manifest. The IP client receiving the above manifest plays the chunks linearly. Let us assume that the IP client receives a command signifying that the viewer has requested 2× fast forward operation. Let us assume that each chunk contains four sub chunks. The server uses the sub chunk information list to determine the specific sub chunks that must be presented by the IP client during the normal presentation of each chunk in order to provide 2× operation (i.e. two sub chunks in the case of a chunk containing four sub chunks) and removes the sub chunks not needed in the chunk. The IP client uses the sub chunk information list provided as a comment in manifest or as a encoded chunk file name to determine the byte offset and size of the specified sub chunk and fetches only specified sub chunk content from the server by issuing a HTTP Get command with needed sub chunk size (two sub chunks within a chunk) and presents it to the user thus achieving 2× operation.

In one embodiment (to explain the third and fourth aspects of the invention)—For each chunk, the streamer prepares the following key frame information list (which can be for any frame) to be passed to the client as a standard manifest comment or the above list can be passed to the client as part of content filename. The standard manifest comment, depending upon a HTTP streaming standard; adheres to that particular streaming standard. Key frame information to be part of each chunk includes the following information:

| The Frame information to be part of each chunk | Explanation |
| --- | --- |
| Number of I frames | The number of I frames within a chunk - a number |
| I frame duration (or I and immediate P/B frame duration) | The time duration of I frame - in mille seconds. |
| Number of I frames in a chunk | The number of I frames in a chunk - a number |
| Byte offsets of each I frame | Byte offset of each I frame from the beginning of the chunk - a number |
| Size of each I frame | Byte size of each I frame - a number |
| I frame repeat count | The number of times an I frame to be repeated - number |
| I frame presentation duration | I frame presentation duration to achieve desired trickplay speed - Either (total chunk duration/trick play speed)/(Number of I frames in the chunk) Or as indicated by the server |
| I frames to play for x Fast Forward | The sequence of I frames to be played to achieve a fast forward at the rate of x |
| I frames play for x Rewind | The sequence of I frames to be played to achieve a rewind at the rate of x |

If the server is creating the video by transcoding, then the server creates each chunk such that reference frames are placed almost equidistantly and each chunk starts from a reference frame. However, since the frame information list contains the duration and number of frames, the client can do any fine adjustment needed to meet the play durations even if the reference frames are not spaced equidistant.

To explain the third aspect of the invention—The streamer serves the manifest which includes all or subset of the above I frame information as part of manifest comment. Each chunk URI is preceded by a comment containing I frame information for each chunk. If each chunk is having the same I frame information for some of the I frame information list, then a single comment served once as part of a manifest fetch is sufficient.

The new manifest may include statements in the following form as an example:

```
#EXTINF:0.5,
# Number of I frames = 2; I frame duration = 33, 33; Byte offset
of each I frame = 0, 35626; size of each I frame = 10356, 10366
    http://192.168.0.185/Myrecord_chunk1.ts
#EXTINF:0.5,
# Number of I frames = 2, I frame duration = 30,30; Byte offset
of each I frame = 0, 45626; size of each I frame = 12356, 12366
    http://192.268.0.185/Myrecord_chunk2.ts
#EXTINF:0.5,
...
```

Alternatively, the new manifest may include statements in the following form with the chunk file name containing a frame information list as encoded below—

```
    #EXTINF:0.5,
    http://192.168.0.185/
    Myrecord_chunk1_2_33_33_0_10356_35626_10366.
ts
    #EXTINF:0.5,
    http://192.268.0.185/Myrecord_chunk2_2_30_.....ts
...
```

In the above example file name
http://192.168.0.185/
Myrecord_chunk1_2_33_33_0_10356_35626_10366.ts
"2" denotes Number of I frames, "33" denotes time duration of first I frame in milli seconds, next "33" denotes time duration of second I frame in milliseconds, "0" denotes a byte offset of first I frame, "10356" denotes the size of first I frame. Similarly, "35626" denotes a byte offset of the second I frame, and "10366" denotes the size of the second I frame.

The I frame information list in the manifest may also contain I frames to play for x Fast Forward or Rewind, so that it would be easy for the IP client to know which I frames to play for what duration to achieve the indicated speed.

In both examples, the EXT-X-DISCONTINUITY tag could be included between consecutive chunks to indicate an encoding discontinuity between the preceding chunk and the following chunk.

The IP client is receiving the above manifest and plays the chunks linearly. Let us assume that the IP client receives a command signifying that the viewer has requested a 2× fast forward operation. Let us assume that each chunk contains two I frames and chunk duration of one second. The IP client uses I frame information list to determine the number of I frames that must be presented for the needed duration in order to provide 2× operation. The following table shows the calculations needed to find out the I frame presentation duration needed to provide a desired trickplay speed with different combinations—

| I frame presentation duration in seconds = (total chunk duration/trick play speed)/(Number of I frames in the chunk) | Number of I frames in the chunk | trickplay speed needed | chunk duration in seconds |
|---|---|---|---|
| 0.25 | 2 | 2 | 1 |
| 0.5 | 1 | 2 | 1 |
| 0.125 | 4 | 2 | 1 |
| 0.25 | 1 | 4 | 1 |
| 0.1 | 5 | 2 | 1 |
| 2.25 | 2 | 2 | 9 |
| 4.5 | 1 | 2 | 9 |
| 1.125 | 4 | 2 | 9 |
| 2.25 | 1 | 4 | 9 |
| 0.9 | 5 | 2 | 9 |

The IP client uses the I frame information list provided as a comment in the manifest or as a encoded chunk file name to determine the byte offset and size of each I frame and fetches only the I frame content from server by issuing a HTTP Get command with the needed frame size and presents it to the user for a needed duration as computed above thus achieving 2× operation (i.e. First I frame for 0.25 seconds and second I frame for 0.25 seconds or only the first I frame for 0.5 seconds and skipping the next frame).

Thus by playing the number of I frames for a duration of (total chunk duration/trick play speed)/(Number of I frames in the chunk), a desired trickplay is achieved by the IP client.

The IP clients who don't need trickplay can play the content of the manifest linearly without any side effects. Thus the server is trickplay agnostic.

To explain the fourth aspect of the invention—The streamer serves the manifest which includes all or a subset of above I frame information as part of manifest comment along with instruction on specific I frames to play to achieve IP client desired play speed. The main advantage is that, in the case of I frames having different durations within or across chunks or if the number of I frames varies across chunks or in a variable frame rate situation, the server can do fine adjustment of play duration by picking up specific I frames and durations. Each chunk URI is preceded by a comment containing the I frame information if each chunk is having different I frame information along with an instruction on specific I frames; optionally the specific I frame duration can be set to play to achieve IP client desired play speed. The new manifest may include statements in the following form as an example with the chunk file name containing a sub chunk information list including sub chunks to play in an indicated order:

```
#EXTINF:0.5,
# Number of I frames = 2; Byte offset of each I frame = 0, 35626;
size of each I frame = 10356, 10366; I frame presentation duration =
0.250,0.250; I frames to play for 2x Fast Forward = 1, 2
    http://192.168.0.185/Myrecord_chunk1.ts
#EXTINF:0.5,
# Number of I frames = 2; Byte offset of each I frame = 0, 45626;
size of each I frame = 12356, 12366; I frame presentation duration =
0.250,0.250; I frames to play for 2x Fast Forward = 1, 2
    http://192.268.0.185/Myrecord_chunk2.ts
#EXTINF:05,
...
```

Alternatively, the new manifest may include statements in the following form with the chunk file name containing an I frame information list that includes I frames to play in the indicated order as encoded below—

```
#EXTINF:0.5,
    http://192.168.0.185/Myrecord_chunk1_2_0_10356_35626_10366_250_250_1_2.ts
#EXTINF:0.5,
    http://192.268.0.185/Myrecord_chunk2_2_0_....ts
...
```

In the above example file name http://192.168.0.185/Myrecord_chunk1_2_0_10356_35626_10366_250_ 250_1_2.ts "2" denotes Number of I frames, "0" denotes the byte offset of first I frame, and "10356" denotes the size of the first I frame. Similarly, "35626" denotes byte offset of the second I frame, "10366" denotes the size of the second I frame, the first "250" denotes presentation duration of the first I frame, and the next "250" denotes presentation duration of next I frame, while the next "1" and "2" instructs the IP client to play the frame number one and two.

In both examples, the EXT-X-DISCONTINUITY tag could be included between consecutive chunks to indicate an encoding discontinuity between the preceding chunk and the following chunk.

If the IP client receives a command signifying that the viewer has requested 2× fast forward operation, the IP client sends an HTTP command to the streamer signifying that a fast forward (FF) operation has been requested. The streamer server calculates the I frames to be played to achieve the desired speed and creates the manifest containing the information on specific I frames to play for a specific duration as per (total chunk duration/trick play speed)/ (Number of I frames in the chunk). The IP client is receiving above the manifest and plays the I frames as signalled in the order by the streamer server. Let us assume that the IP client receives a command signifying that the viewer has requested a 2× fast forward operation. The IP client uses the I frame information list provided as a comment in the manifest or as an encoded chunk file name to determine the byte offset and the size of the specified I frame and fetches only the I frame content from server by issuing a HTTP Get command with the needed frame size and presents it to the user for a duration as specified by the server thus achieving the 2× operation.

By playing a number of I frames for a duration of (total chunk duration/trick play speed)/(Number of I frames in the chunk) or by playing I frames as directed by the server, a desired trickplay is achieved by the IP client with server aid.

The IP clients who don't need trickplay can play the content of the manifest linearly without any side effects. Thus the other client remains trickplay agnostic when not requesting the trickplay.

In another embodiment, if the IP client receives a command signifying that the viewer has requested a 2× fast forward operation, the IP client sends an HTTP command to the streamer signifying that fast forward (FF) operation has been requested. The streamer server calculates the I frames to be played to achieve the desired speed, removes I frames not needed from chunk data and creates the manifest. The IP client uses the I frame information list provided as a comment in the manifest or as a encoded chunk file name to determine the byte offset and the size of the specified I frame and fetches only the specified I frame content from the server by issuing a HTTP Get command with the needed frame size.

The IP client may run not only on an STB, as discussed, but also on a tablet or phone that is connected to the internet, either through a home gateway, as described in connection with FIG. 1, or through other network infrastructure such as the cellular telephone network infrastructure.

The foregoing discussion is based on the possibility of the streamer 20 being remote from the home and the content being supplied from the streamer to the home gateway over the internet 40. In a another implementation, the streamer may be located in the home and connected to receive content delivered over the cable TV distribution network. Thus, a streamer 20', which is connected to the home gateway over a home network 62, may receive content from a cable system headend (not shown) over a coaxial cable 60. The streamer 20' performs the functions attributed to the streamer 20 in the foregoing discussion and interacts with the STB 46 in the same manner as the streamer 20.

Figure 2:
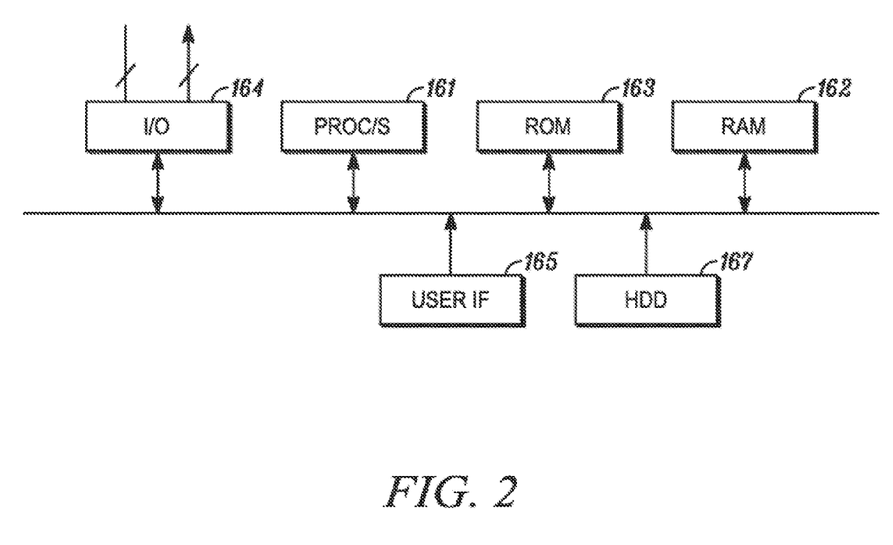
FIG. 2 is a schematic block diagram of a computing device that may be used to implement the methods described with reference to FIG. 1.
Figure 3:
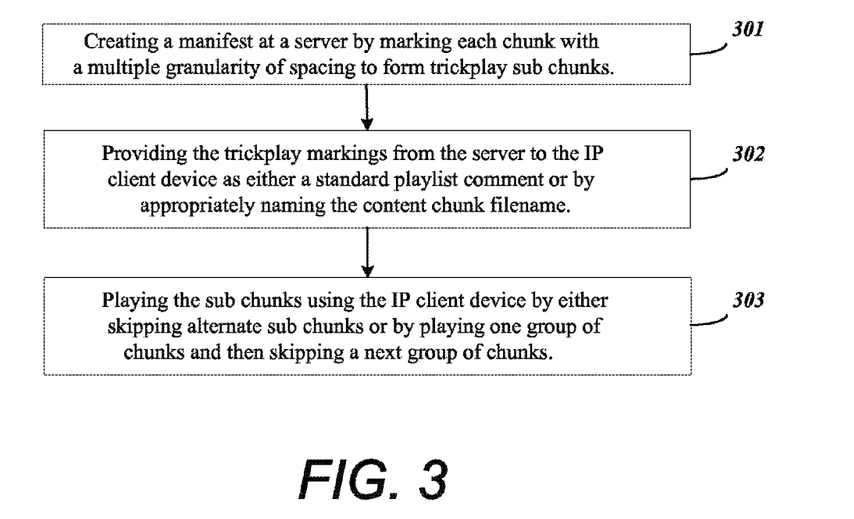
FIG. 3 shows a flowchart illustrating a first aspect of the invention.

Referring to FIG. 2, one or more of the functional blocks shown in FIG. 1 for receiving the IP packets from the home gateway 42 and producing the signal for driving the TV appliance 50 may be implemented by a computing device comprising at least one processor 161, random access memory 162, read only memory 163, I/O devices 164 (including suitable adaptors for receiving and transmitting bitstreams), a user interface 165, a hard disk drive 167 and one or more buses, configured in a generally conventional architecture. The computing device operates in accordance with a program that is stored in a non-transitory computer readable memory, such as the hard disk drive 167, and is loaded into the random access memory 162 for execution. The program is composed of instructions such that when the computing device receives a signal representing the input of the STB 46, by way of a suitable interface included in the I/O devices, the computing device allocates memory to appropriate buffers and utilizes other suitable resources and functions to perform the various operations that are described above as being performed by the functional blocks of the STB.

FIGS. 3-6 are flow charts illustrating the first through fourth aspects of the present invention. In the first aspect shown in FIG. 3, in a first step 301 a manifest is created at the server such that the server marks each chunk with a multiple granularity of spacing forming trickplay sub chunks. These trickplay markings (denoting trickplay sub chunks) are generated such that they start with a reference frame and end with any video frame. In one embodiment, the server creates each chunk such that reference frames and trickplay markings are placed almost equidistantly spaced. In a second step 302, the trickplay markings are conveyed to an IP client as a standard playlist comment or in the alternative the trickplay markings are implicitly conveyed to a client by naming the content chunk filename with these trickplay markings. In a third step 303, the IP client device upon receiving the playlist, parses the trickplay markings and plays needed individual sub chunks in a manner to meet the desired trickplay speed. To meet the desired speed, in a step the client can play and skip alternate sub chunks, or play one group of sub chunks and skip a next group of sub chunks.

Figure 4:
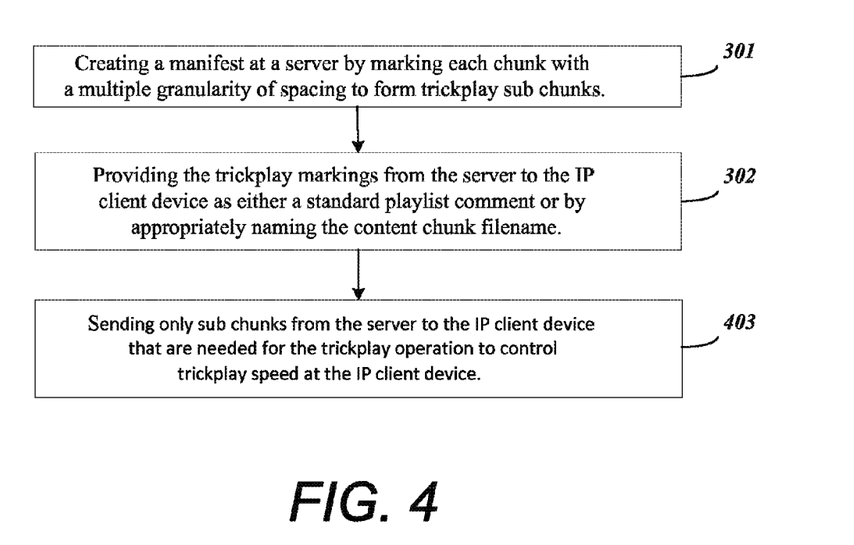
FIG. 4 shows a flowchart illustrating a second aspect of the invention.

FIG. 4 shows the second aspect of the invention. In the second aspect, the first two steps 301 of marking the trickplay sub chunks and then 302 of providing the trickplay markings to the IP client device are the same as the first aspect. In a new step 403 of this second aspect, the server only sends the sub chunks to the IP client device for playing with some sub chunks removed to control the desired trickplay speed rather than relying on the IP client device itself to skip chunks.

Figure 5:
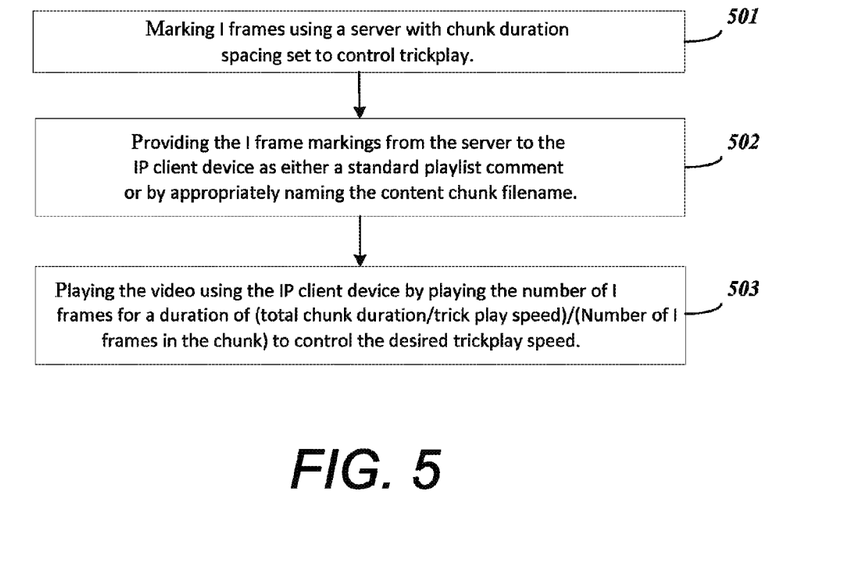
FIG. 5 shows a flowchart illustrating a third aspect of the invention.

FIG. 5 shows a fourth aspect of the present invention. Initially in FIG. 5 in step 501 the server marks I frames with spacing depending on chunk duration to control trickplay. In step 502 the markings are conveyed to IP client as standard playlist comment or appropriately naming the content chunk filename. In a step 503, the IP client upon receiving the playlist, parses the frame markings and plays needed individual frame(s) to meet the desired trickplay speed. The IP client plays the number of I frames for a duration of (total chunk duration/trick play speed)/(Number of I frames in the chunk) to control the desired trickplay speed.

Figure 6:
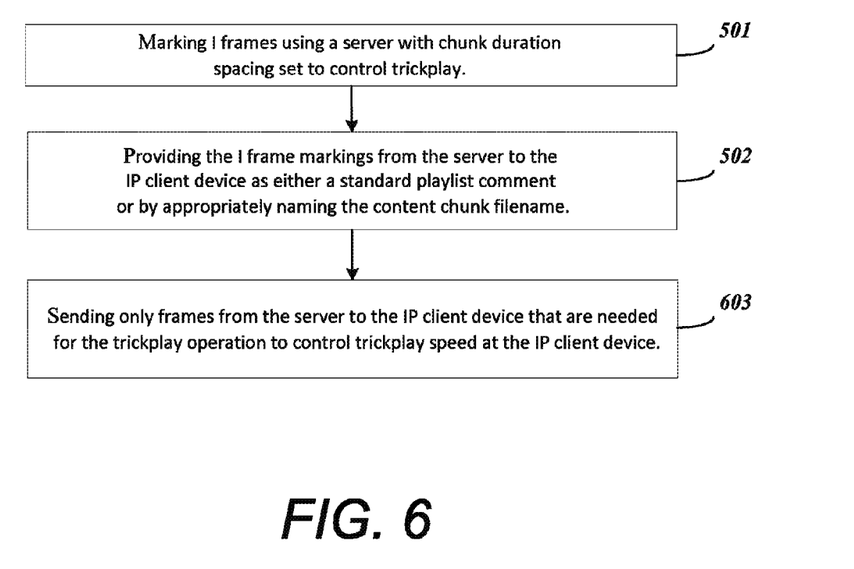
FIG. 6 shows a flowchart illustrating a fourth aspect of the invention.

FIG. 6 shows the fourth aspect of the invention. In the fourth aspect, the first two steps 501 of marking the I frames and then 502 of providing the I frame markings to the IP client device are the same as the third aspect. In a new step 603 of this fourth aspect, the server only sends the frames marked to the IP client device for playing with other frame portions removed to control the desired trickplay speed rather than relying on the IP client device itself to control speed.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of operating a server device for presentation of video content to a viewer, wherein in a normal play mode the video content is received from the server in chunk fragments each containing a plurality of video frames and an IP client device presents the video frames at a predetermined, uniform frame rate, the method comprising:
   creating a manifest at the server such that the server marks each chunk with multiple predetermined granularity of spacing forming trickplay sub chunk markings, the spacing dependant upon chunk duration and a total manifest play duration,
   wherein the trickplay sub chunk markings (denoting trickplay sub chunks) are generated such that they start with a reference frame and end with any video frame, and spacing the trickplay markings using the server so that the trickplay markings are placed almost equidistantly,
   providing a sub chunk information list for each of the chunks comprising: (a) a number of sub chunks, (b) sub chunk durations, (c) a number of frames in each of the sub chunks, (d) byte offsets for each of the sub chunks, (e) a size for each of the sub chunks, and (f) an indication of a number of sub chunks to play for achieving a desired speed.

2. The method of claim 1, wherein the sub chunk information list is conveyed by the server to the IP client as a standard playlist comment.

3. The method of claim 1, wherein the sub chunk information list is conveyed by the server to the IP client by naming a content chunk filename with the sub chunk information.

4. A method according to claim 1, wherein the sub chunk information list indicates the sub chunks to play by the IP client based on a desired trickplay speed of the client.

* * * * *